United States Patent
Huang et al.

(10) Patent No.: US 10,536,509 B2
(45) Date of Patent: Jan. 14, 2020

(54) SYNCHRONIZING METHOD, TERMINAL, AND SERVER

(71) Applicant: Huawei Device Co., Ltd., Dongguan (CN)

(72) Inventors: Jiejing Huang, Shenzhen (CN); Huangwei Wu, Shenzhen (CN)

(73) Assignee: HUAWEI DEVICE CO., LTD., Dongguan (CN)

( * ) Notice: Subject to any disclaimer, the term of this patent is extended or adjusted under 35 U.S.C. 154(b) by 312 days.

(21) Appl. No.: 15/103,772

(22) PCT Filed: Jan. 10, 2014

(86) PCT No.: PCT/CN2014/070464
§ 371 (c)(1),
(2) Date: Jun. 10, 2016

(87) PCT Pub. No.: WO2015/085664
PCT Pub. Date: Jun. 18, 2015

(65) Prior Publication Data
US 2016/0316000 A1 Oct. 27, 2016

(30) Foreign Application Priority Data
Dec. 10, 2013 (WO) ................ PCT/CN2013/088974

(51) Int. Cl.
G06F 15/173 (2006.01)
H04L 29/08 (2006.01)
(52) U.S. Cl.
CPC .......... H04L 67/10 (2013.01); H04L 67/1095 (2013.01)
(58) Field of Classification Search
CPC .................................................. H04L 67/1095
(Continued)

(56) References Cited

U.S. PATENT DOCUMENTS 5,862,325 A * 1/1999 Reed ............... H04L 29/06
704/270.1
7,441,180 B1 * 10/2008 Kaczmarek ........... G06F 21/10
715/201
(Continued)

FOREIGN PATENT DOCUMENTS

CN 101257375 A 9/2008
CN 101340274 A 1/2009
(Continued)

OTHER PUBLICATIONS

Foreign Communication From a Counterpart Application, European Application No. 14869808.7, European Office Action dated May 11, 2017, 6 pages.
(Continued)

*Primary Examiner* — Anthony Mejia
(74) *Attorney, Agent, or Firm* — Conley Rose, P.C.

(57) ABSTRACT

A synchronization method includes uploading, by a first terminal, data to a server, where the server is associated with at least one second terminal; receiving, by the first terminal, a notification sent by the server, where the notification includes information of the at least one second terminal; determining, by the first terminal according to the notification, that the first terminal and the at least one second terminal are in a same local area network; and sending, by the first terminal, the data to the at least one second terminal by using the local area network. In this way, data synchronization between a source device and a target device is implemented in a local area network in which the source device and the target device are located. Thus, time consumption of synchronization is reduced, and synchronization efficiency is improved.

8 Claims, 6 Drawing Sheets

---

A server is associated with a first terminal, and receives data uploaded by the first terminal; and the server is associated with at least one second terminal, and acquires information of the at least one second terminal — S601

When the server determines that the first terminal and the at least one second terminal are in a same local area network, the server sends a notification to the first terminal, where the notification includes the information of the at least one second terminal, and the at least one second terminal and the first terminal are in the same local area network — S602

(58) Field of Classification Search
USPC .................................................. 709/223
See application file for complete search history.

(56) References Cited

U.S. PATENT DOCUMENTS

| | | | |
|---|---|---|---|
| 8,019,900 B1 | 9/2011 | Sekar et al. | |
| 8,578,416 B1* | 11/2013 | Radloff | H04N 5/445 725/41 |
| 9,591,069 B2* | 3/2017 | Thornburgh | H04L 67/1046 |
| 2002/0090934 A1* | 7/2002 | Mitchelmore | H04L 29/06 455/412.2 |
| 2003/0074403 A1* | 4/2003 | Harrow | H04L 47/10 709/203 |
| 2003/0140159 A1* | 7/2003 | Campbell | H04L 29/06 709/231 |
| 2003/0154238 A1* | 8/2003 | Murphy | H04L 41/00 709/201 |
| 2004/0068516 A1* | 4/2004 | Lee | G06F 16/182 |
| 2004/0179502 A1* | 9/2004 | Naghian | H04L 63/08 370/338 |
| 2004/0187024 A1* | 9/2004 | Briscoe | H04L 63/08 726/29 |
| 2006/0026168 A1* | 2/2006 | Bosworth | G06F 8/60 |
| 2007/0014314 A1* | 1/2007 | O'Neil | H04L 67/104 370/503 |
| 2008/0040181 A1* | 2/2008 | Freire | G06Q 10/06316 705/7.26 |
| 2008/0077635 A1* | 3/2008 | Sporny | G06F 16/1834 |
| 2009/0043867 A1* | 2/2009 | Sharp | H04L 67/1095 709/218 |
| 2009/0106455 A1 | 4/2009 | Xu et al. | |
| 2009/0210631 A1* | 8/2009 | Bosworth | G06F 12/0875 711/141 |
| 2009/0238213 A1* | 9/2009 | Kasatani | H04N 1/00344 370/503 |
| 2010/0161759 A1 | 6/2010 | Brand | |
| 2010/0229222 A1* | 9/2010 | Li | H04N 7/17318 726/5 |
| 2011/0296013 A1 | 12/2011 | Saunders et al. | |
| 2012/0166516 A1 | 6/2012 | Simmons et al. | |
| 2013/0054527 A1 | 2/2013 | Hwang et al. | |
| 2013/0110981 A1* | 5/2013 | Thornburgh | H04L 67/1046 709/219 |
| 2013/0290256 A1 | 10/2013 | Barrall et al. | |
| 2014/0067762 A1* | 3/2014 | Carvalho | G06F 16/27 707/636 |
| 2014/0122658 A1* | 5/2014 | Haeger | H04L 29/0854 709/219 |
| 2014/0136599 A1* | 5/2014 | Shiue | H04L 67/1095 709/203 |
| 2014/0215568 A1* | 7/2014 | Kirigin | G06F 21/00 726/4 |
| 2015/0032690 A1* | 1/2015 | Hoque | G06F 16/27 707/610 |
| 2015/0058287 A1 | 2/2015 | Zhang | |
| 2015/0089019 A1* | 3/2015 | Chou | H04L 67/1097 709/217 |
| 2015/0120662 A1* | 4/2015 | Dai | H04L 67/1095 707/634 |
| 2016/0337437 A1* | 11/2016 | Gartsbein | H04L 67/06 |
| 2017/0337013 A1* | 11/2017 | Nozawa | G06F 3/0625 |

FOREIGN PATENT DOCUMENTS

| | | |
|---|---|---|
| CN | 102739808 A | 10/2012 |
| CN | 102882985 A | 1/2013 |
| CN | 103108051 A | 5/2013 |
| CN | 103118032 A | 5/2013 |
| CN | 103327037 A | 9/2013 |
| EP | 0765062 B1 | 11/2005 |
| WO | 2012177253 A1 | 12/2012 |

OTHER PUBLICATIONS

Partial English Translation and Abstract of Chinese Patent Application No. CN102739808, Jun. 25, 2016, 5 pages.
Partial English Translation and Abstract of Chinese Patent Application No. CN103108051, May 15, 2013, 4 pages.
Foreign Communication From a Counterpart Application, European Application No. 14869808.7, Extended European Search Report dated Oct. 24, 2016, 10 pages.
Foreign Communication From a Counterpart Application, PCT Application No. PCT/CN2013/088974, English Translation of International Search Report dated Sep. 17, 2014, 2 pages.
Foreign Communication From a Counterpart Application, PCT Application No. PCT/CN2013/088974, English Translation of Written Opinion dated Sep. 17, 2014, 8 pages.
Foreign Communication From a Counterpart Application, PCT Application No. PCT/CN2014/070464, English Translation of International Search Report dated Sep. 24, 2014, 2 pages.
Foreign Communication From a Counterpart Application, PCT Application No. PCT/CN2014/070464, English Translation of Written Opinion dated Sep. 24, 2014, 21 pages.
Foreign Communication From a Counterpart Application, European Application No. 14869808.7, European Office Action dated Apr. 6, 2018, 7 pages.
Foreign Communication From a Counterpart Application, European Office Action 14869808.7, European Office Action dated Sep. 3, 2018, 8 pages.
Foreign Communication From a Counterpart Application, Chinese Application No. 201480012250.5, Chinese Notice of Allowance dated Aug. 1, 2019, 4 pages.

* cited by examiner

SYNCHRONIZING METHOD, TERMINAL, AND SERVER

CROSS-REFERENCE TO RELATED APPLICATIONS

This application is a National Stage of International Application No. PCT/CN2014/070464, filed on Jan. 10, 2014, which claims priority to International Application No. PCT/CN2013/088974, filed on Dec. 10, 2013, both of which are hereby incorporated by reference in their entireties.

TECHNICAL FIELD

The present disclosure relates to the field of synchronization technologies, and in particular, to a synchronization method, a terminal, and a server.

BACKGROUND

With the development of Internet technologies, cloud synchronization has become a trend of future synchronization development, and convenience of cloud synchronization gradually attracts attention of users. Cloud synchronization refers to data synchronization between a cloud device and a server on a cloud platform, or individual-centered data sharing between different devices.

For the individual-centered data sharing between different devices, a conventional manner for cloud synchronization between different devices is that a source device can synchronize data to a target device only by using a cloud server, that is, the source device needs to synchronize, to a cloud server first, data that needs to be synchronized, and then the cloud server synchronizes the data to the target device.

Even if the source device and the target device are located in a same local area network, synchronization between the source device and the target device is performed still according to the foregoing cloud synchronization manner that uses the cloud server as an agency. Therefore, a long time is consumed, and synchronization efficiency is low.

SUMMARY

The present disclosure provides a synchronization method, a terminal, and a server, so as to reduce time consumption of synchronization between devices in a same local area network and improve synchronization efficiency.

According to a first aspect, the present disclosure provides an embodiment of a synchronization method.

In a first possible implementation manner, the method includes uploading, by a first terminal, data to a server, where the server is associated with at least one second terminal; receiving, by the first terminal, a notification sent by the server, where the notification includes information of the at least one second terminal; determining, by the first terminal according to the notification, that the first terminal and the at least one second terminal are in a same local area network; and sending, by the first terminal, the data to the at least one second terminal by using the local area network.

With reference to the first possible implementation manner of the first aspect, in a second possible implementation manner, the information of the at least one second terminal is login information for the at least one second terminal to log in to the server; the first terminal and the at least one second terminal use a same account to log in to the server; and the determining, by the first terminal according to the notification, that the first terminal and the at least one second terminal are in a same local area network is sending, by the first terminal, a probe request to one or more other terminals in the local area network in which the first terminal is located, where the probe request includes login information for the first terminal to log in to the server; and receiving, by the first terminal, a response message from the at least one second terminal, and determining, according to the response message, that the at least one second terminal and the first terminal are in the same local area network, where the response message is a response of the at least one second terminal to the probe request sent by the first terminal.

With reference to the first or second possible implementation manner of the first aspect, in a third possible implementation manner, the method further includes sending, by the first terminal, an indication message to the server, where the indication message is used to indicate that the first terminal sends, in the local area network, the data to the at least one second terminal.

According to a second aspect, the present disclosure provides an embodiment of a synchronization method.

In a first possible implementation manner, the method includes uploading, by a first terminal, data to a server, where the server is associated with at least one second terminal; receiving, by the first terminal, a notification from the server, where the notification includes information of the at least one second terminal, and the at least one second terminal and the first terminal are in a same local area network; and sending, by the first terminal, the data to the at least one second terminal by using the local area network.

With reference to the first possible implementation manner of the second aspect, in a second possible implementation manner, the method further includes sending, by the first terminal, an indication message to the server, where the indication message is used to indicate that the first terminal sends, in the local area network, the data to the at least one second terminal.

According to a third aspect, the present disclosure provides an embodiment of a synchronization method.

In a first possible implementation manner, the method includes uploading, by a first terminal, data to a server, where the server is associated with at least one second terminal; and when the first terminal determines that the at least one second terminal and the first terminal are in a same local area network, sending, by the first terminal, the data to the at least one second terminal by using the local area network.

With reference to the first possible implementation manner of the third aspect, in a second possible implementation manner, the first terminal sends an indication message to the server, where the indication message is used to notify that the first terminal has sent the to-be-synchronized data to the at least one second terminal.

With reference to the first or second possible implementation manner of the third aspect, in a third possible implementation manner, the first terminal and the at least one second terminal use a same account to log in to the server; and that the first terminal determines that the at least one second terminal and the first terminal are in a same local area network is sending, by the first terminal, a probe request to one or more other terminals in the local area network in which the first terminal is located, where the probe request includes login information for the first terminal to log in to the server; and receiving, by the first terminal, a response message from the at least one second terminal, and determining, according to the response message, that the at least one second terminal and the first terminal are in the same local area network, where the response message is a response of the at least one second terminal to the probe request sent by the first terminal.

According to a fourth aspect, the present disclosure provides an embodiment of a synchronization method.

In a first possible implementation manner, the method includes associating a first terminal with a server, where the server is associated with the second terminal, and the first terminal and the second terminal are in a same local area network; and receiving, by the first terminal, data that is sent by the second terminal by using the local area network, where the data is to-be-synchronized data that is uploaded by the second terminal to the server.

With reference to the first possible implementation manner of the fourth aspect, in a second possible implementation manner, the first terminal and the at least one second terminal use a same account to log in to the server; and before the receiving, by the first terminal, data that is sent by the second terminal by using the local area network, the method further includes receiving, by the first terminal, a probe request that is sent by the second terminal by using the local area network, where the probe request includes login information for the first terminal to log in to the server; and sending, by the first terminal, a response message to the second terminal, where the response message is used to indicate that the first terminal and the second terminal are in the same local area network, and the response message is a response of the at least one second terminal to the probe request sent by the first terminal.

With reference to the first or second possible implementation manner of the fourth aspect, in a third possible implementation manner, before the receiving, by the first terminal, data that is sent by the second terminal by using the local area network, the method further includes receiving, by the first terminal, a request performing data synchronization in the local area network sent by the second terminal; and sending, by the first terminal, a response to the data synchronization request to the second terminal.

With reference to the third possible implementation manner of the fourth aspect, in a fourth possible implementation manner, the data synchronization request includes a synchronization credential, where the synchronization credential includes at least identity information of the data; and after the receiving, by the first terminal, data that is sent by the second terminal by using the local area network, the method further includes, when it is determined that the synchronization credential matches the data, determining, by the first terminal, that the data is the to-be-synchronized data sent by the second terminal.

With reference to any one of the first to fourth possible implementation manners of the fourth aspect, in a fifth possible implementation manner, after the receiving, by the first terminal, data that is sent by the second terminal by using the local area network, the method further includes extracting, by the first terminal, the identity information of the data; sending, by the first terminal, a verification request to the server, where the verification request is used to request the server to verify whether the identity information matches the synchronized data that is sent by the second terminal and received by the server, and the verification request includes the identity information; and receiving, by the first terminal, confirmation information that is sent by the server according to the verification request when the identity information matches the to-be-synchronized data that is sent by the second terminal and received by the server, where the confirmation information is used to confirm that the data received by the terminal is consistent with the synchronized data that is sent by the second terminal to the server.

With reference to the fifth possible implementation manner of the fourth aspect, in a sixth possible implementation manner, the first terminal receives an indication message that is sent by the server according to the verification request when the identity information does not match the synchronized data that is sent by the second terminal and received by the server, where the indication message is used to indicate that the data received by the first terminal does not match the to-be-synchronized data sent by the second terminal.

According to a fifth aspect, the present disclosure provides an embodiment of a synchronization method.

In a first possible implementation manner, the method includes associating a server with a first terminal, and receiving data uploaded by the first terminal; and associating the server with at least one second terminal, and acquiring information of the at least one second terminal; and sending, by the server, a notification to the first terminal, where the notification includes the information of the at least one second terminal.

With reference to the first possible implementation manner of the fifth aspect, in a second possible implementation manner, the method further includes receiving, by the server, an indication message sent by the first terminal, where the indication message is used to indicate that the first terminal sends, in the local area network, the data to the at least one second terminal.

With reference to the first or second possible implementation manner of the fifth aspect, in a third possible implementation manner, the method further includes receiving, by the server, a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; and when it is confirmed that the data that is uploaded by the first terminal and received by the server is consistent with the identity information, sending, by the server, confirmation information to the at least one second terminal, where the confirmation information is used to confirm that the data received by the at least one second terminal matches the data received by the server.

With reference to the third possible implementation manner of the fifth aspect, in a fourth possible implementation manner, the method further includes, when it is confirmed that the data that is uploaded by the first terminal and received by the server is inconsistent with the identity information, sending, by the server, an indication message to the at least one second terminal, where the indication message is used to confirm that the data received by the at least one second terminal does not match the data received by the server.

According to a sixth aspect, the present disclosure provides an embodiment of a synchronization method.

In a first possible implementation manner, the method includes associating a server with a first terminal, and receiving data uploaded by the first terminal; and associating the server with at least one second terminal, and acquiring information of the at least one second terminal; and when the server determines that the first terminal and the at least one second terminal are in a same local area network, sending, by the server, a notification to the first terminal, where the notification includes the information of the at least one second terminal, and the at least one second terminal and the first terminal are in the same local area network.

With reference to the first possible implementation manner of the sixth aspect, in a second possible implementation manner, the method further includes receiving, by the server, an indication message sent by the first terminal, where the indication message is used to indicate that the first terminal sends, in the local area network, the data to the at least one second terminal.

With reference to the first or second possible implementation manner of the sixth aspect, in a third possible implementation manner, the method further includes receiving, by the server, a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; and when it is confirmed that the data that is uploaded by the first terminal and received by the server is consistent with the identity information, sending, by the server, confirmation information to the at least one second terminal, where the confirmation information is used to confirm that the data received by the at least one second terminal matches the data received by the server.

With reference to the third possible implementation manner of the sixth aspect, in a fourth possible implementation manner, the method further includes, when it is confirmed that the data that is uploaded by the first terminal and received by the server is inconsistent with the identity information, sending, by the server, an indication message to the at least one second terminal, where the indication message is used to confirm that the data received by the at least one second terminal does not match the data received by the server.

According to a seventh aspect, the present disclosure provides an embodiment of a terminal.

In a first possible implementation manner, the terminal includes a transmitter configured to upload data to a server, where the server is associated with at least one second terminal; and send the data to the at least one second terminal by using the local area network; a receiver configured to receive a notification sent by the server, where the notification includes information of the at least one second terminal; and a processor configured to determine, according to the notification, that the first terminal and the at least one second terminal are in the same local area network.

With reference to the first possible implementation manner of the seventh aspect, in a second possible implementation manner, the information of the at least one second terminal is login information for the at least one second terminal to log in to the server; the first terminal and the at least one second terminal use a same account to log in to the server; the transmitter is further configured to send a probe request to one or more other terminals in the local area network in which the terminal is located, where the probe request includes login information for the first terminal to log in to the server; the receiver is further configured to receive a response message from the at least one second terminal, where the response message is a response of the at least one second terminal to the probe request sent by the first terminal; and the processor is further configured to determine, according to the response message, that the at least one second terminal and the first terminal are in the same local area network.

With reference to the first or second possible implementation manner of the seventh aspect, in a third possible implementation manner, the transmitter is further configured to send an indication message to the server, where the indication message is used to indicate that the first terminal sends, in the local area network, the data to the at least one second terminal.

According to an eighth aspect, the present disclosure provides an embodiment of a terminal.

In a first possible implementation manner, the terminal includes a transmitter configured to upload data to a server, where the server is associated with at least one second terminal, and the at least one second terminal and the first terminal are in a same local area network; and send the data to the at least one second terminal by using the local area network; and a receiver configured to receive a notification from the server, where the notification includes information of the at least one second terminal.

With reference to the first possible implementation manner of the eighth aspect, in a second possible implementation manner, the transmitter is further configured to send an indication message to the server, where the indication message is used to indicate that the first terminal sends, in the local area network, the data to the at least one second terminal.

According to a ninth aspect, the present disclosure provides an embodiment of a terminal.

In a first possible implementation manner, the terminal includes a transmitter configured to upload data to a server, where the server is associated with at least one second terminal; and when a determining circuit determines that the at least one second terminal and the first terminal are in a same local area network, send the data to the at least one second terminal by using the local area network; and the determining circuit configured to determine that the at least one second terminal and the first terminal are in the same local area network.

With reference to the first possible implementation manner of the ninth aspect, in a second possible implementation manner, the transmitter is further configured to send an indication message to the server, where the indication message is used to notify that the first terminal has sent the to-be-synchronized data to the at least one second terminal.

With reference to the first or second possible implementation manner of the ninth aspect, in a third possible implementation manner, the first terminal and the at least one second terminal use a same account to log in to the server; the determining circuit includes a transmitter, a receiver, and a processor; and that the determining circuit determines that the at least one second terminal and the first terminal are in the same local area network is the transmitter is further configured to send a probe request to one or more other terminals in the local area network in which the terminal is located, where the probe request includes login information for the first terminal to log in to the server; the receiver is configured to receive a response message from the at least one second terminal, where the response message is a response of the at least one second terminal to the probe request sent by the first terminal; and the processor is configured to determine, according to the response message, that the at least one second terminal and the first terminal are in the same local area network.

According to a tenth aspect, the present disclosure provides an embodiment of a terminal.

In a first possible implementation manner, the terminal includes a connector, associated with a server, where the server is associated with the second terminal, and the terminal and the second terminal are in a same local area network; and a receiver, receiving data that is sent by the second terminal by using the local area network, where the data is to-be-synchronized data that is uploaded by the second terminal to the server.

With reference to the first possible implementation manner of the tenth aspect, in a second possible implementation manner, the terminal and the at least one second terminal use a same account to log in to the server; the receiver is further configured to receive, before receiving the data that is sent by the second terminal by using the local area network, a probe request that is sent by the second terminal by using the local area network, where the probe request includes login information for the first terminal to log in to the server; and the terminal further includes a transmitter configured to send a response message to the second terminal, where the response message is used to indicate that the first terminal and the second terminal are in the same local area network, and the response message is a response of the at least one second terminal to the probe request sent by the first terminal.

With reference to the first possible implementation manner of the tenth aspect, in a third possible implementation manner, the receiver is further configured to receive, before receiving the data that is sent by the second terminal by using the local area network, a request for performing data synchronization in the local area network sent by the second terminal; and the terminal further includes a transmitter configured to send a response to the data synchronization request to the second terminal.

With reference to the second possible implementation manner of the tenth aspect, in a fourth possible implementation manner, the receiver is further configured to receive, before receiving the data that is sent by the second terminal by using the local area network, a request for performing data synchronization in the local area network sent by the second terminal; and the transmitter is further configured to send a response to the data synchronization request to the second terminal.

With reference to the third or fourth possible implementation manner of the tenth aspect, in a fifth possible implementation manner, the data synchronization request includes a synchronization credential, where the synchronization credential includes at least identity information of the data; and the terminal further includes a processor configured to, after the receiver receives the data that is sent by the second terminal by using the local area network, when it is determined that the synchronization credential matches the data, determine that the data is the to-be-synchronized data sent by the second terminal.

With reference to the first possible implementation manner of the tenth aspect, in a sixth possible implementation manner, the electronic device further includes a processor configured to extract identity information of the data after the receiver receives the data that is sent by the second terminal by using the local area network; and a transmitter configured to send a verification request to the server, where the verification request is used to request the server to verify whether the identity information matches the synchronized data that is sent by the second terminal and received by the server, and the verification request includes the identity information; where the receiver is further configured to receive confirmation information that is sent by the server according to the verification request when the identity information matches the to-be-synchronized data that is sent by the second terminal and received by the server, where the confirmation information is used to confirm that the data received by the terminal is consistent with the synchronized data that is sent by the second terminal to the server.

With reference to any one of the second to fourth possible implementation manners of the tenth aspect, in a seventh possible implementation manner, the electronic device further includes a processor configured to extract identity information of the data after the receiver receives the data that is sent by the second terminal by using the local area network; where the transmitter is further configured to send a verification request to the server, where the verification request is used to request the server to verify whether the identity information matches the synchronized data that is sent by the second terminal and received by the server, and the verification request includes the identity information; and the receiver is further configured to receive confirmation information that is sent by the server according to the verification request when the identity information matches the to-be-synchronized data that is sent by the second terminal and received by the server, where the confirmation information is used to confirm that the data received by the terminal is consistent with the synchronized data that is sent by the second terminal to the server.

With reference to the sixth or seventh possible implementation manner of the tenth aspect, in an eighth possible implementation manner, the receiver is further configured to receive an indication message that is sent by the server according to the verification request when the identity information does not match the synchronized data that is sent by the second terminal and received by the server, where the indication message is used to indicate that the data received by the first terminal does not match the to-be-synchronized data sent by the second terminal.

According to an eleventh aspect, the present disclosure provides an embodiment of a server.

In a first possible implementation manner, the server includes a connector configured to associate with a first terminal, where the server is associated with at least one second terminal; a receiver configured to receive data uploaded by the first terminal; a processor configured to acquire information of the at least one second terminal; and a transmitter configured to send a notification to the first terminal, where the notification includes the information of the at least one second terminal.

With reference to the first possible implementation manner of the eleventh aspect, in a second possible implementation manner, the receiver is further configured to receive an indication message sent by the first terminal, where the indication message is used to indicate that the first terminal sends, in the local area network, the data to the at least one second terminal.

With reference to the first or second possible implementation manner of the eleventh aspect, in a third possible implementation manner, the receiver is further configured to receive a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; the processor is further configured to confirm whether the data that is uploaded by the first terminal and received by the server is consistent with the identity information; and the transmitter is further configured to, when the processor confirms that the data that is uploaded by the first terminal and received by the server is consistent with the identity information, send confirmation information to the at least one second terminal, where the confirmation information is used to confirm that the data received by the at least one second terminal matches the data received by the server.

With reference to the third possible implementation manner of the eleventh aspect, in a fourth possible implementation manner, the transmitter is further configured to, when the processor confirms that the data that is uploaded by the first terminal and received by the server is inconsistent with the identity information, send an indication message to the at least one second terminal, where the indication message is used to confirm that the data received by the at least one second terminal does not match the data received by the server.

According to a twelfth aspect, the present disclosure provides an embodiment of a server.

In a first possible implementation manner, the server includes a connector configured to associate with a first terminal and associate with at least one second terminal; a receiver configured to receive data uploaded by the first terminal; a processor configured to acquire information of the at least one second terminal, and determine whether the first terminal and the at least one second terminal are in a same local area network; and a transmitter configured to, when the processor determines that the first terminal and the at least one second terminal are in the same local area network, send a notification to the first terminal, where the notification includes the information of the at least one second terminal, and the at least one second terminal and the first terminal are in the same local area network.

With reference to the first possible implementation manner of the twelfth aspect, in a second possible implementation manner, the receiver is further configured to receive an indication message sent by the first terminal, where the indication message is used to indicate that the first terminal sends, in the local area network, the data to the at least one second terminal.

With reference to the first or second possible implementation manner of the twelfth aspect, in a third possible implementation manner, the receiver is further configured to receive a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; the processor is further configured to confirm whether the data that is uploaded by the first terminal and received by the server is consistent with the identity information; and the transmitter is further configured to, when the processor confirms that the data that is uploaded by the first terminal and received by the server is consistent with the identity information, send confirmation information to the at least one second terminal, where the confirmation information is used to confirm that the data received by the at least one second terminal matches the data received by the server.

With reference to the third possible implementation manner of the twelfth aspect, in a fourth possible implementation manner, the transmitter is further configured to, when the processor confirms that the data that is uploaded by the first terminal and received by the server is inconsistent with the identity information, send an indication message to the at least one second terminal, where the indication message is used to confirm that the data received by the at least one second terminal does not match the data received by the server.

According to the embodiments of the present disclosure, when a source device and a target device that are to be synchronized are located in a same local area network, data synchronization between the source device and the target device is implemented in the local area network in which the source device and the target device are located. In this way, time consumption of synchronization is reduced, and synchronization efficiency is improved.

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Embodiment 1

Figure 1:
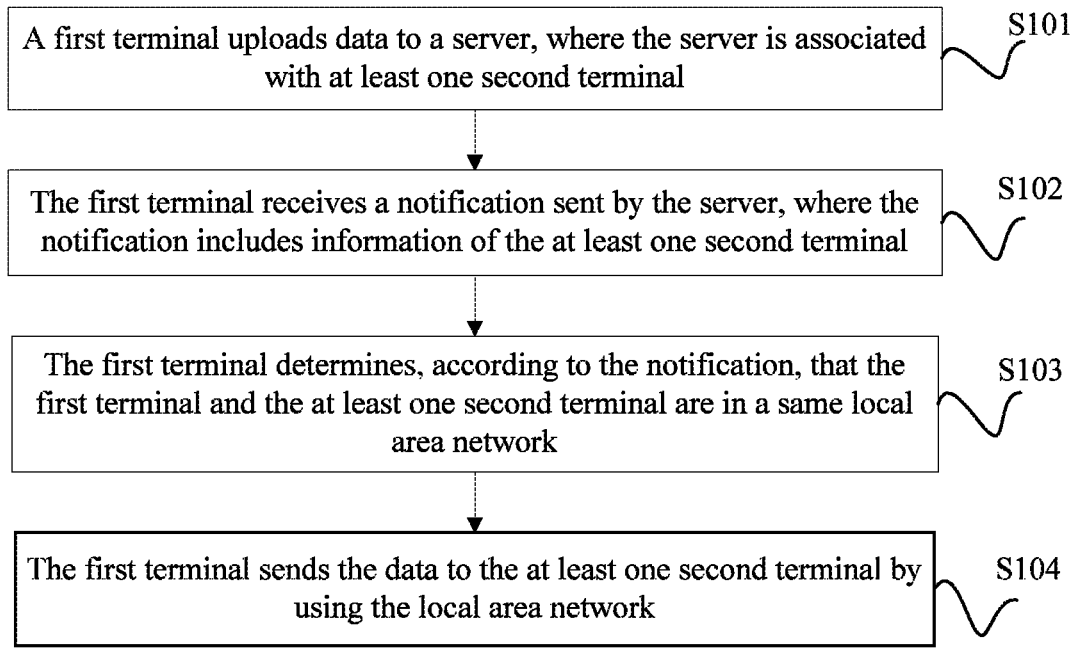
FIG. 1 is a schematic flowchart of a synchronization method according to an embodiment of the present disclosure.

FIG. 1 is a flowchart of a synchronization method according to an embodiment of the present disclosure. As shown in the figure, the method includes the following steps.

S101. A first terminal uploads data to a server, where the server is associated with at least one second terminal.

In this embodiment of the present disclosure, the first terminal logs in to the server, and uploads, to the server, data updated by the first terminal. The first terminal has completed uploading of the data, and the server has received the data uploaded by the first terminal. The first terminal performs a subsequent operation, for example, searching for at least one second terminal in the local area network in which the first terminal is located, only after the first terminal completes uploading of the data updated by the terminal. Alternatively, the first terminal uploads, to the server, data updated by the terminal. The first terminal is in a process of uploading data to the server, and uploading of the updated data has not been completed, and the server has not received complete data updated by the first terminal. When the first terminal is in the process of uploading data to the server, the first terminal may perform an operation such as searching for at least one second terminal in a local area network in which the first terminal is located. This embodiment of the present disclosure sets no limitation thereto.

The server is associated with the at least one second terminal, where the association may be that the server is connected to the at least one second terminal. The first terminal and the at least one second terminal log in to the same server. An account that the at least one second terminal uses to log in to the server may be the same as or different from an account that the first terminal uses to log in to the server.

S102. The first terminal receives a notification sent by the server, where the notification includes information of the at least one second terminal.

After logging in to the server, the first terminal receives the notification sent by the server. The notification includes the information of the at least one second terminal.

Optionally, the information of the at least one second terminal may be address information of the at least one second terminal, such as an Internet Protocol (IP) address.

Optionally, the information of the at least one second terminal may be login information of the at least one second terminal, including account information for the at least one second terminal to log in to the server, and the like.

S103. The first terminal determines, according to the notification, that the first terminal and the at least one second terminal are in a same local area network.

The first terminal acquires the information of the at least one second terminal according to the notification, and the first terminal determines, according to the information of the at least one second terminal, that the at least one second terminal is in the same local area network.

Optionally, when the information of the at least one second terminal is the address information of the at least one second terminal, the first terminal acquires the address information of the at least one second terminal; and the first terminal determines, according to the IP address of the at least one second terminal, that the at least one second terminal and the first terminal are in the same local area network. Alternatively, when the information of the at least one second terminal is the address information of the at least one second terminal, the server determines, according to address information of the first terminal and the address information of the at least one second terminal, that the first terminal and the at least one second terminal are in the same local area network, where the notification includes information indicating that the first terminal and the at least one second terminal are in the same local area network.

Optionally, when the information of the at least one second terminal is the login information of the at least one second terminal, the first terminal acquires the login information of the at least one second terminal, sends a probe request to one or more other terminals in the local area network in which the first terminal is located, receives responses of one or more other terminals in the local area network in which the first terminal is located, and determines that the first terminal and the at least one second terminal are in the same local area network.

S104. The first terminal sends the data to the at least one second terminal by using the local area network.

After the first terminal determines that the at least one second terminal and the first terminal are in the same local area network, the first terminal sends, in the local area network, the data to the at least one second terminal. The data sent by the first terminal to the at least one second terminal is the same as the data sent by the first terminal to the server.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the information of the at least one second terminal is the login information for the at least one second terminal to log in to the server; the first terminal and the at least one second terminal use a same account to log in to the server; and that first terminal determines, according to the notification, that the first terminal and the at least one second terminal are in a same local area network is the first terminal sends a probe request to one or more other terminals in the local area network in which the first terminal is located, where the probe request includes login information for the first terminal to log in to the server; and the first terminal receives a response message from the at least one second terminal, and determines, according to the response message, that the at least one second terminal and the first terminal are in the same local area network, where the response message is a response of the at least one second terminal to the probe request sent by the first terminal.

The login information may include account information and address information of the at least one second terminal. The probe request includes at least one of: the account information for the first terminal to log in to the server and the address information of the first terminal; and that the first terminal sends a probe request to one or more other terminals in the local area network+k is the first terminal broadcasts a message in the local area network to probe one or more other terminals that use a same account in the local area network to log in to a same cloud server; or the first terminal broadcasts a message to specific terminals in the local area network to probe one or more other terminals that use a same account in the local area network to log in to a same cloud server; or when a user of the terminal learns that one or more other terminals use a same account for login in the local area network, the first terminal sends a message by means of directional unicast to a terminal corresponding to an instruction identifier (ID) in the local area network.

After receiving the probe request sent by the first terminal, the at least one second terminal acquires the account information for the first terminal to log in to the server. The at least one second terminal sends a response to the probe request to the first terminal, where the response includes at least one of: the account information for the at least one second terminal to log in to the server and the address information of the at least one second terminal. The first terminal receives the response of the at least one second terminal to the probe request, and determines, according to the response message, that the at least one second terminal and the first terminal are in the same local area network.

In a possible implementation manner of this embodiment of the present disclosure, the method further includes the first terminal sends an indication message to the server, where the indication message is used to indicate that the first terminal sends, in the local area network, the data to the at least one second terminal. After receiving the indication message, the server no longer sends, to the at least one second terminal, the data uploaded by the first terminal. Optionally, the at least one second terminal may also send the indication message to the server.

Embodiment 2

Figure 2:
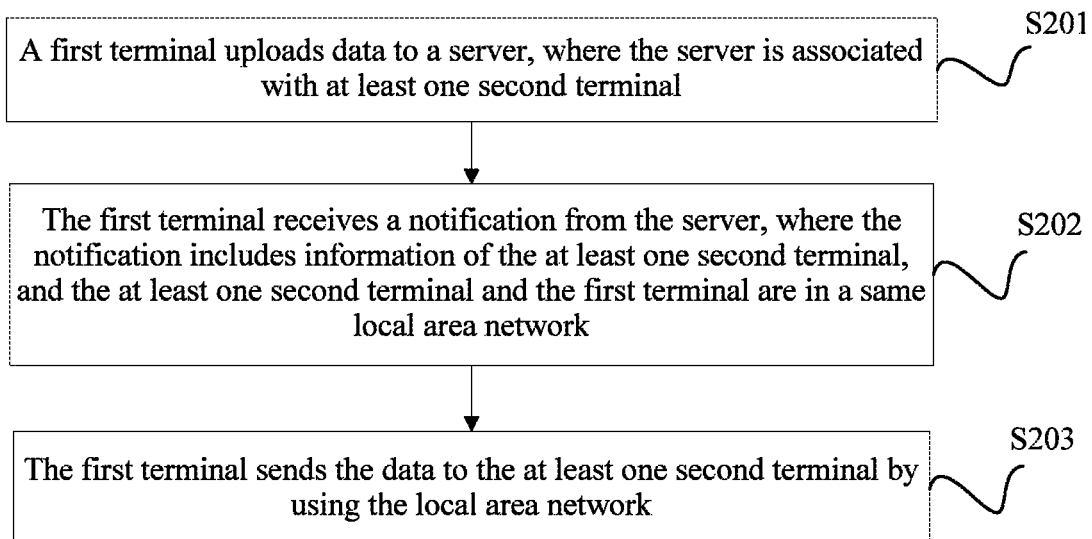
FIG. 2 is a schematic flowchart of a synchronization method according to an embodiment of the present disclosure.

FIG. 2 is a flowchart of a synchronization method according to an embodiment of the present disclosure. As shown in the figure, the method includes the following steps.

S201. A first terminal uploads data to a server, where the server is associated with at least one second terminal.

S202. The first terminal receives a notification from the server, where the notification includes information of the at least one second terminal, and the first terminal and the at least one second terminal are in a same local area network.

After logging in to the server, the first terminal receives the notification sent by the server. The notification includes the information of the at least one second terminal. The first terminal and the at least one second terminal are in the same local area network.

Optionally, the notification received by the first terminal from the server may include the information of the at least one second terminal and information indicating that the at least one second terminal and the first terminal are in the same local area network.

Optionally, the information of the at least one second terminal may be address information of the at least one second terminal, such as an IP address, or a hardware interface parameter for receiving the data.

Optionally, the information of the at least one second terminal may be login information of the at least one second terminal, including account information for the at least one second terminal to log in to the server, and the like.

S203. The first terminal sends the data to the at least one second terminal by using the local area network.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the method further includes the first terminal sends an indication message to the server, where the indication message is used to indicate that the first terminal sends, in the local area network, the data to the at least one second terminal. After receiving the indication message, the server no longer sends, to the at least one second terminal, the data uploaded by the first terminal. Optionally, the at least one second terminal may also send the indication message to the server.

Embodiment 3

Figure 3:
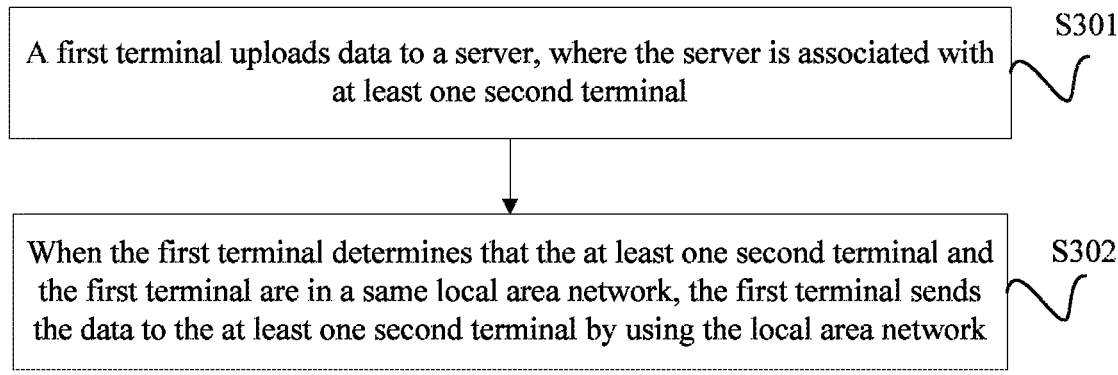
FIG. 3 is a schematic flowchart of a synchronization method according to an embodiment of the present disclosure.

FIG. 3 is a flowchart of a synchronization method according to an embodiment of the present disclosure. As shown in the figure, the method includes the following steps.

S301. A first terminal uploads data to a server, where the server is associated with at least one second terminal.

S302. When the first terminal determines that the at least one second terminal and the first terminal are in a same local area network, the first terminal sends the data to the at least one second terminal by using the local area network.

After the first terminal determines that the at least one second terminal and the first terminal are in the same local area network, the first terminal sends, in the local area network, the data to the at least one second terminal. The data sent by the first terminal to the at least one second terminal is the same as the data sent by the first terminal to the server.

Optionally, the first terminal determines that the at least one second terminal and the first terminal are in a same local area network is the first terminal sends a probe request to one or more other terminals in the local area network in which the first terminal is located, where the probe request may include at least one of: account information or address information of the first terminal; the first terminal receives a response message from the at least one second terminal in the local area network, where the response message is a response of the at least one second terminal to the probe request; and the first terminal determines, according to the response message, that the first terminal and the at least one second terminal are in the same local area network.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the method further includes the first terminal sends an indication message to the server, where the indication message is used to notify that the first terminal has sent the to-be-synchronized data to the at least one second terminal. Optionally, the at least one second terminal may also send the indication message to the server.

In a possible implementation manner of this embodiment of the present disclosure, the first terminal and the at least one second terminal use a same account to log in to the server; and that the first terminal determines that the at least one second terminal and the first terminal are in a same local area network is the first terminal sends a probe request to one or more other terminals in the local area network in which the first terminal is located, where the probe request includes login information for the first terminal to log in to the server; and the first terminal receives a response message from the at least one second terminal, and determines, according to the response message, that the at least one second terminal and the first terminal are in the same local area network, where the response message is a response of the at least one second terminal to the probe request sent by the first terminal.

The probe request includes at least one of: the account information for the first terminal to log in to the server and the address information of the first terminal; and that the first terminal sends a probe request to one or more other terminals in the local area network is the terminal broadcasts a message in the local area network to probe one or more other terminals that use a same account in the local area network to log in to a same cloud server; or the terminal broadcasts a message to specific terminals in the local area network to probe one or more other terminals that use a same account in the local area network to log in to a same cloud server; or when a user of the terminal learns that one or more other terminals use a same account for login in the local area network, the terminal sends a message by means of directional unicast to a terminal corresponding to an instruction ID in the local area network.

After receiving the probe request sent by the first terminal, the at least one second terminal acquires the account information for the first terminal to log in to the server. The at least one second terminal sends a response to the probe request to the first terminal, where the response includes at least one of: account information for the at least one second terminal to log in to the server and address information of the at least one second terminal. The first terminal receives the response of the at least one second terminal to the probe request, and determines, according to the response message, that the at least one second terminal and the first terminal are in the same local area network.

Embodiment 4

Figure 4:
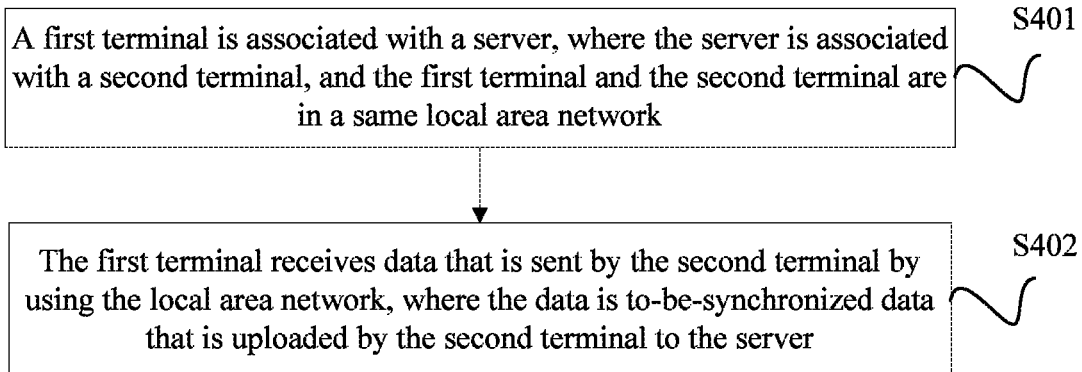
FIG. 4 is a schematic flowchart of a synchronization method according to an embodiment of the present disclosure.

FIG. 4 is a flowchart of a synchronization method according to an embodiment of the present disclosure. As shown in the figure, the method includes the following steps.

S401. A first terminal is associated with a server, where the server is associated with the second terminal, and the first terminal and the second terminal are in a same local area network.

In this embodiment of the present disclosure, the first terminal logs in to the server, and uploads, to the server, data updated by the first terminal. The first terminal has completed uploading of the data, and the server has received the data uploaded by the first terminal. The first terminal performs a subsequent operation, for example, searching for at least one second terminal in the local area network in which the first terminal is located, only after the first terminal completes uploading of the data updated by the terminal. Alternatively, the first terminal uploads, to the server, the data updated by the terminal. The first terminal is in a process of uploading data to the server, and uploading of the updated data has not been completed, and the server has not received complete data updated by the first terminal. When the first terminal is in the process of uploading data to the server, the first terminal may perform an operation such as searching for at least one second terminal in the local area network in which the first terminal is located. This embodiment of the present disclosure sets no limitation thereto.

The server is associated with the at least one second terminal, where the association may be that the server is connected to the at least one second terminal. The first terminal and the at least one second terminal log in to the same server. An account that the at least one second terminal uses to log in to the server may be the same as or different from an account that the first terminal uses to log in to the server.

The first terminal and the second terminal are in the same local area network. Optionally, the first terminal receives a notification from the server, where the notification includes information of the at least one second terminal that is in the same local area network as the first terminal, such as login information and/or address information of the at least one second terminal. Optionally, the first terminal sends a probe request to one or more other terminals in the local area network in which the first terminal is located, to probe the at least one second terminal that logs in to the same server as the first terminal, and determines, according to responses of the one or more other terminals to the probe request, the at least one second terminal that is in the same local area network as the first terminal.

S402. The first terminal receives data that is sent by the second terminal by using the local area network, where the data is to-be-synchronized data that is uploaded by the second terminal to the server.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the first terminal and the at least one second terminal use a same account to log in to the server; and before the first terminal receives the data that is sent by the second terminal by using the local area network, the method further includes the first terminal receives a probe request that is sent by the second terminal by using the local area network, where the probe request includes login information for the first terminal to log in to the server; and the first terminal sends a response message to the second terminal, where the response message is used to indicate that the first terminal and the second terminal are in the same local area network, and the response message is a response of the at least one second terminal to the probe request sent by the first terminal.

The probe request includes at least one of: account information for the first terminal to log in to the server and address information of the first terminal; and that the first terminal sends a probe request to one or more other terminals in the local area network is the terminal broadcasts a message in the local area network to probe one or more other terminals that use a same account in the local area network to log in to a same cloud server; or the terminal broadcasts a message to specific terminals in the local area network to probe one or more other terminals that use a same account in the local area network to log in to a same cloud server; or when a user of the terminal learns that one or more other terminals use a same account for login in the local area network, the terminal sends a message by means of directional unicast to a terminal corresponding to an instruction ID in the local area network.

After receiving the probe request sent by the first terminal, the at least one second terminal acquires the account information for the first terminal to log in to the server. The at least one second terminal sends a response to the probe request to the first terminal, where the response includes at least one of: account information for the at least one second terminal to log in to the server and the address information of the at least one second terminal. The first terminal receives the response of the at least one second terminal to the probe request, and determines, according to the response message, that the at least one second terminal and the first terminal are in the same local area network.

In a possible implementation manner of this embodiment of the present disclosure, before the first terminal receives the data that is sent by the second terminal by using the local area network, the method further includes the first terminal receives a request for performing data synchronization in the local area network sent by the second terminal; and the first terminal sends a response to the data synchronization request to the second terminal. Optionally, the second terminal may send, by using the server, the request for performing data synchronization to the first terminal. Optionally, the second terminal may send, in the local area network, the request for performing data synchronization to the first terminal.

In a possible implementation manner of this embodiment of the present disclosure, the data synchronization request includes a synchronization credential, where the synchronization credential includes at least identity information of the data; and after the first terminal receives the data that is sent by the second terminal by using the local area network, the method further includes, when it is determined that the synchronization credential matches the data, the first terminal determines that the data is the to-be-synchronized data sent by the second terminal. The synchronization credential includes at least the identity information of the data that is sent by the second terminal to the first terminal. The first terminal matches the synchronization credential with the data received by the terminal, and when it is determined that the synchronization credential matches the data received by the terminal, determines that the data is the to-be-synchronized data sent by the second terminal. The synchronization credential may be one or more of identities such as a digest, a hash value, a name, and a size of the data. Introduction of the synchronization credential may ensure correctness and integrity of transmitted data.

In a possible implementation manner of this embodiment of the present disclosure, after the first terminal receives the data that is sent by the second terminal by using the local area network, the method further includes the first terminal extracts the identity information of the data; the first terminal sends a verification request to the server, where the verification request is used to request the server to verify whether the identity information matches the synchronized data that is sent by the second terminal and received by the server, and the verification request includes the identity information; and the first terminal receives confirmation information that is sent by the server according to the verification request when the identity information matches the to-be-synchronized data that is sent by the second terminal and received by the server, where the confirmation information is used to confirm that the data received by the terminal is consistent with the synchronized data that is sent by the second terminal to the server. When the first terminal confirms that the data received by the terminal matches the data that is received by the server, the first terminal may save the data.

Further, the method further includes the first terminal receives an indication message that is sent by the server according to the verification request when the identity information does not match the synchronized data that is sent by the second terminal and received by the server, where the indication message is used to indicate that the data received by the first terminal does not match the to-be-synchronized data sent by the second terminal. When the first terminal confirms, according to the indication message, that the data received by the terminal does not match the data received by the server, the first terminal may delete the data. The first terminal may further receive the to-be-synchronized data sent by the server.

Embodiment 5

Figure 5:
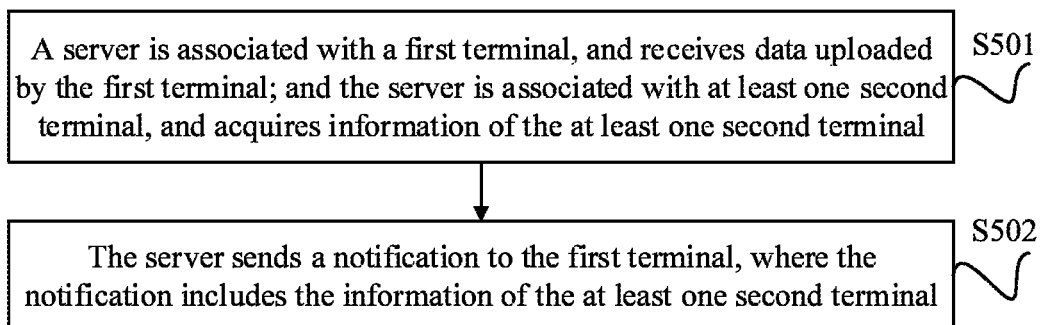
FIG. 5 is a schematic flowchart of a synchronization method according to an embodiment of the present disclosure.

FIG. 5 is a flowchart of a synchronization method according to an embodiment of the present disclosure. As shown in the figure, the method includes the following steps S501. A server is associated with a first terminal, and receives data uploaded by the first terminal; and the server is associated with at least one second terminal, and acquires information of the at least one second terminal.

In this embodiment of the present disclosure, the server is associated with the first terminal. The association may be that the first terminal is connected to the server. The first terminal has to-be-synchronized data. The first terminal sends the to-be-synchronized data to the server, and the server receives the data uploaded by the first terminal. The server is associated with the at least one second terminal. The association may be that the second terminal is connected to the server. The server acquires the information of the at least one second terminal. The information of the at least one second terminal may include one or more of: address information, login information and the like of the at least one second terminal.

S502. The server sends a notification to the first terminal, where the notification includes the information of the at least one second terminal.

After the server acquires the information of the at least one second terminal, the server sends the notification to the first terminal, where the notification includes at least the information of the at least one second terminal. After acquiring the notification sent by the server, the first terminal determines, according to the notification, the at least one second terminal that is in a same local area network as the first terminal. After the first terminal determines the at least one second terminal in the local area network in which the first terminal is located, the first terminal sends, in the local area network, the data to the at least one second terminal.

In this embodiment of the present disclosure, the first terminal determines, according to the notification sent by the server, the at least one second terminal that is in the same local area network as the terminal, and implements data synchronization in the same local area network. In this way, time consumption of synchronization is reduced, and synchronization efficiency is improved.

In a possible implementation manner of this embodiment of the present disclosure, the method further includes the server receives an indication message sent by the first terminal, where the indication message is used to indicate that the first terminal sends, in the local area network, the data to the at least one second terminal. After acquiring the indication message, the server no longer sends, to the at least one second terminal, the data that is sent by the first terminal and received by the server.

In a possible implementation manner of this embodiment of the present disclosure, the method further includes the server receives a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; and when it is confirmed that the data that is uploaded by the first terminal and received by the server is consistent with the identity information, the server sends confirmation information to the at least one second terminal, where the confirmation information is used to confirm that the data received by the at least one second terminal matches the data received by the server. The identity information may be one or more of identities such as a digest, a hash value, a name, and a size of the data.

Further, the method further includes, when it is confirmed that the data that is uploaded by the first terminal and received by the server is inconsistent with the identity information, the server sends an indication message to the at least one second terminal, where the indication message is used to confirm that the data received by the at least one second terminal does not match the data received by the server. The server may further send, to the at least one second terminal, the data that is sent by the first terminal and received by the server.

Embodiment 6

Figure 6:
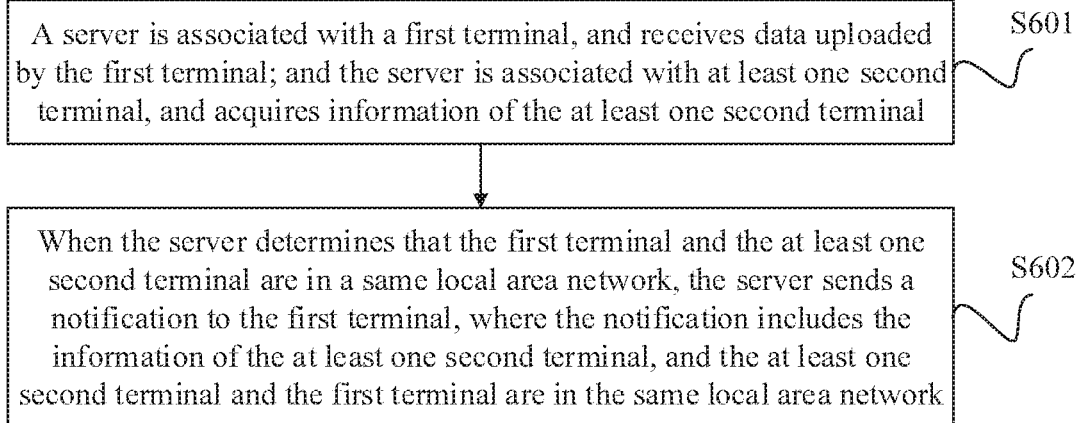
FIG. 6 is a schematic flowchart of a synchronization method according to an embodiment of the present disclosure.

FIG. 6 is a flowchart of a synchronization method according to an embodiment of the present disclosure. As shown in the figure, the method includes the following steps.

S601. A server is associated with a first terminal, and receives data uploaded by the first terminal; and the server is associated with at least one second terminal, and acquires information of the at least one second terminal.

S602. When the server determines that the first terminal and the at least one second terminal are in a same local area network, the server sends a notification to the first terminal, where the notification includes the information of the at least one second terminal, and the at least one second terminal and the first terminal are in the same local area network.

When the server determines, according to information of the first terminal and the information of the at least one second terminal, that the first terminal and the at least one second terminal are in the same local area network, the server sends the notification to the first terminal. The information of the first terminal and the at least one second terminal may be address information of the at least one second terminal. The notification may be in a form of signaling, or may be in a form of text information, or may further include address information of the first terminal and/or the at least one second terminal. After the first terminal determines the at least one second terminal in the local area network in which the first terminal is located, the first terminal sends, in the local area network, the data to the at least one second terminal.

In this embodiment of the present disclosure, the first terminal determines, according to the notification sent by the server, the at least one second terminal that is in the same local area network as the terminal, and implements data synchronization in the same local area network. In this way, time consumption of synchronization is reduced, and synchronization efficiency is improved.

In a possible implementation manner of this embodiment of the present disclosure, the method further includes the server receives an indication message sent by the first terminal, where the indication message is used to indicate that the first terminal sends, in the local area network, the data to the at least one second terminal. After receiving the indication message, the server no longer sends, to the at least one second terminal, the data uploaded by the first terminal. Optionally, the at least one second terminal may also send the indication message to the server.

In a possible implementation manner of this embodiment of the present disclosure, the method further includes the server receives a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; and when it is confirmed that the data that is uploaded by the first terminal and received by the server is consistent with the identity information, the server sends confirmation information to the at least one second terminal, where the confirmation information is used to confirm that the data received by the at least one second terminal matches the data received by the server. The identity information may be one or more of identities such as a digest, a hash value, a name, and a size of the data.

Further, the method further includes, when it is confirmed that the data that is uploaded by the first terminal and received by the server is inconsistent with the identity information, the server sends an indication message to the at least one second terminal, where the indication message is used to confirm that the data received by the at least one second terminal does not match the data received by the server. The server may further send, to the at least one second terminal, the data that is sent by the first terminal and received by the server.

The terminal apparatus disclosed in the present disclosure may be seen as a separate apparatus, or integrated in various media data playing apparatuses, for example, a mobile phone, a tablet computer (e.g., a tablet personal computer), a laptop computer, a multimedia player, a personal digital assistant (PDA), a mobile Internet device (MID), or a wearable device.

A processor is a control center of the terminal electronic device, and uses various interfaces and lines to connect each part of the whole electronic device, and by running or executing a software program and/or a module stored in a storing unit and invoking data stored in the storing unit, executes various functions of the electronic device and/or processes data. The processor may include an integrated circuit (IC), for example, may be formed by a single packaged IC, or may be formed by multiple interconnected packaged ICs that have same functions or different functions. For example, the processor may include only a central processing unit (CPU), or may be a combination of a graphical processing unit (GPU), a digital signal processor (DSP), and a control chip (for example, a baseband chip) in a communication unit. In an implementation manner of the present disclosure, the CPU may be a single-operation core, or may include a multi-operation core.

Embodiment 7

Figure 7:
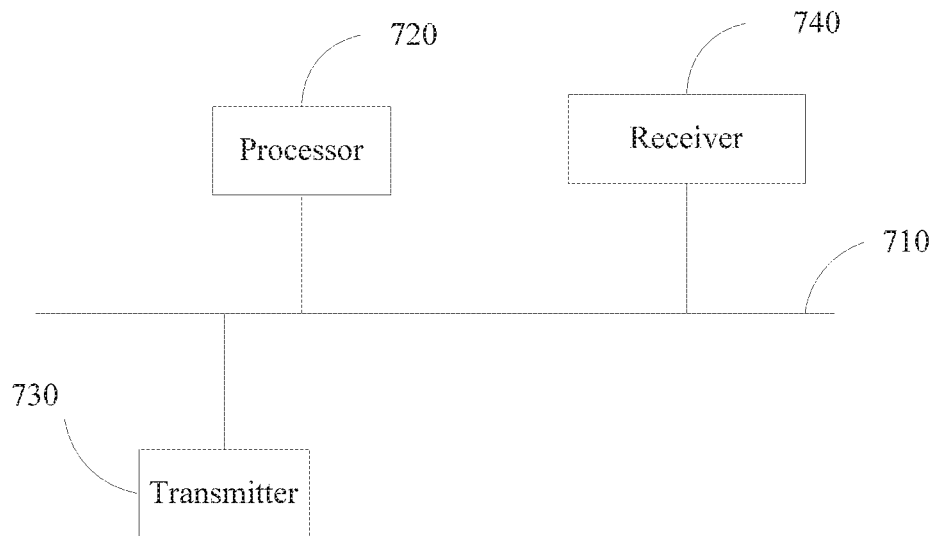
FIG. 7 is a schematic structural diagram of a terminal according to an embodiment of the present disclosure.

FIG. 7 is a schematic structural diagram of an embodiment of a terminal according to the present disclosure. As shown in the figure, the terminal includes the following components.

A transmitter 730 is configured to upload data to a server, where the server is associated with at least one second terminal.

The first terminal is connected to the server, and the transmitter uploads, to the server, data updated by the terminal.

A receiver 740 is configured to receive a notification sent by the server, where the notification includes information of the at least one second terminal.

Optionally, the information of the at least one second terminal that is received by the receiver may be address information of the at least one second terminal, such as an IP address.

Optionally, the information of the at least one second terminal that is received by the receiver may be login information of the at least one second terminal, including account information for the at least one second terminal to log in to the server, and the like.

A processor 720 is configured to determine, according to the notification, that the first terminal and the at least one second terminal are in a same local area network.

Optionally, when the information of the at least one second terminal is the address information of the at least one second terminal, the processor acquires the address information of the at least one second terminal; and the processor determines, according to the IP address of the at least one second terminal, that the at least one second terminal and the first terminal are in the same local area network. Alternatively, when the information of the at least one second terminal is the address information of the at least one second terminal, the server determines, according to address information of the first terminal and the address information of the at least one second terminal, that the first terminal and the at least one second terminal are in the same local area network, where the notification includes information indicating that the first terminal and the at least one second terminal are in the same local area network. The processor acquires the notification, and determines that the first terminal and the at least one second terminal are in the same local area network.

Optionally, when the information of the at least one second terminal is the login information of the at least one second terminal, the processor acquires the login information of the at least one second terminal. The processor instructs the transmitter to send a probe request to one or more other terminals in the local area network in which the first terminal is located, and the receiver receives responses of the one or more other terminals in the local area network in which the first terminal is located. The processor determines, according to the responses, that the first terminal and the at least one second terminal are in the same local area network.

The transmitter 730 is further configured to send the data to the at least one second terminal by using the local area network.

After the processor determines that the first terminal and the at least one second terminal are in the same local area network, the transmitter sends the data to the at least one second terminal by using the local area network. The data sent by the first terminal to the at least one second terminal is the same as the data sent by the first terminal to the server.

A communication bus 710 is configured to implement connection and communication between the processor 720, the transmitter 730, and the receiver.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the information of the at least one second terminal is the login information for the at least one second terminal to log in to the server; the first terminal and the at least one second terminal use a same account to log in to the server; the transmitter is further configured to send a probe request to one or more other terminals in the local area network in which the first terminal is located, where the probe request includes login information for the first terminal to log in to the server; the receiver is further configured to receive a response message from the at least one second terminal, where the response message is a response of the at least one second terminal to the probe request sent by the first terminal; and the processor is further configured to determine, according to the response message, that the at least one second terminal and the first terminal are in the same local area network.

The login information may include account information and address information of the at least one second terminal. The probe request includes at least one of: the account information for the first terminal to log in to the server and the address information of the first terminal; and that the transmitter sends a probe request to one or more other terminals in the local area network is the transmitter broadcasts a message in the local area network to probe one or more other terminals that use a same account in the local area network to log in to a same cloud server; or the transmitter broadcasts a message to specific terminals in the local area network to probe one or more other terminals that use a same account in the local area network to log in to a same cloud server; or when a user of the terminal learns that one or more other terminals use a same account for login in the local area network, the transmitter sends a message by means of directional unicast to a terminal corresponding to an instruction ID in the local area network.

After receiving the probe request sent by the first terminal, the at least one second terminal acquires the account information for the first terminal to log in to the server. The at least one second terminal sends a response to the probe request to the first terminal, where the response includes at least one of: the account information for the at least one second terminal to log in to the server and the address information of the at least one second terminal. The receiver receives the response of the at least one second terminal to the probe request, and the processor determines, according to the response message, that the at least one second terminal and the first terminal are in the same local area network.

In a possible implementation manner of this embodiment of the present disclosure, the transmitter is further configured to send an indication message to the server, where the indication message is used to indicate that the first terminal sends, in the local area network, the data to the at least one second terminal. After receiving the indication message, the server no longer sends, to the at least one second terminal, the data uploaded by the first terminal.

Embodiment 8

Figure 8:
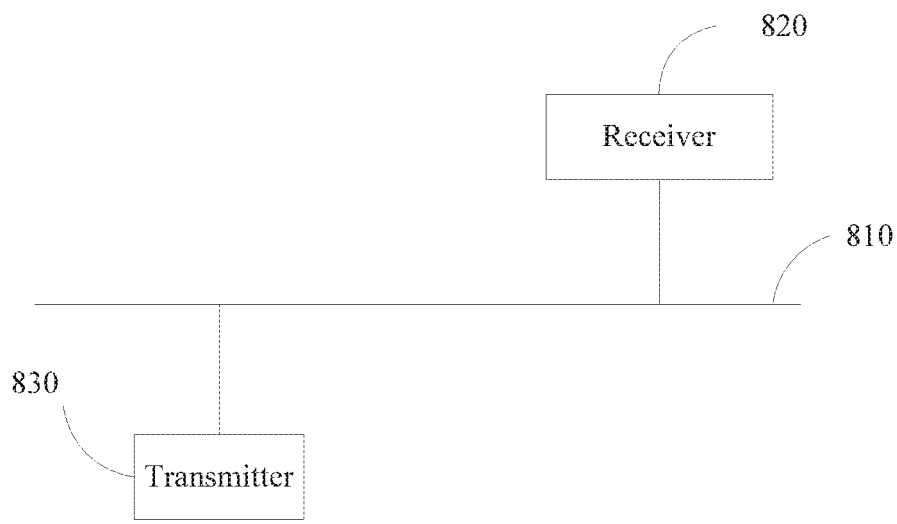
FIG. 8 is a schematic structural diagram of a terminal according to an embodiment of the present disclosure.

FIG. 8 is a schematic structural diagram of an embodiment of a terminal according to the present disclosure. As shown in the figure, the terminal includes the following components.

A transmitter 830 is configured to upload data to a server, where the server is associated with at least one second terminal, and the at least one second terminal and the first terminal are in a same local area network.

A receiver 820 is configured to receive a notification from the server, where the notification includes information of the at least one second terminal.

Optionally, the information of the at least one second terminal that is received by the receiver may be address information of the at least one second terminal, such as an IP address.

Optionally, the information of the at least one second terminal that is received by the receiver may be login information of the at least one second terminal, including account information for the at least one second terminal to log in to the server, and the like.

Optionally, the notification received by the receiver from the server may include the information of the at least one second terminal and information indicating that the at least one second terminal and the first terminal are in the same local area network.

The transmitter 830 is further configured to send the data to the at least one second terminal by using the local area network.

A communication bus 810 is configured to implement connection and communication between the transmitter 830 and the receiver 820.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the transmitter is further configured to send an indication message to the server, where the indication message is used to indicate that the first terminal sends, in the local area network, the data to the at least one second terminal. After receiving the indication message, the server no longer sends, to the at least one second terminal, the data uploaded by the first terminal.

Embodiment 9

Figure 9:
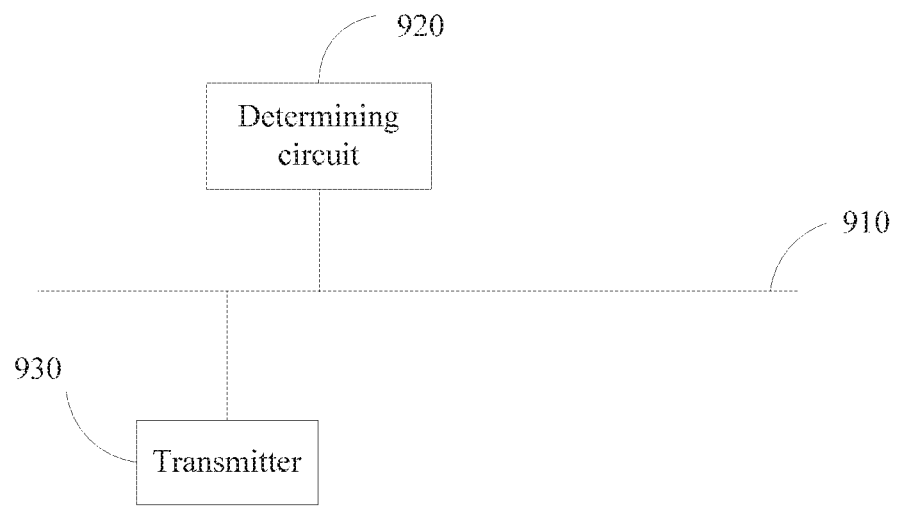
FIG. 9 is a schematic structural diagram of a terminal according to an embodiment of the present disclosure.

FIG. 9 is a schematic structural diagram of an embodiment of a terminal according to the present disclosure. For ease of description, the terminal is called a first terminal in this embodiment of the present disclosure. As shown in the figure, the first terminal includes the following components.

A transmitter 930 is configured to upload data to a server, where the server is associated with at least one second terminal.

A determining circuit 920 is configured to determine that the at least one second terminal and the first terminal are in a same local area network.

A communication bus 910 is configured to implement connection and communication between the transmitter 930 and the determining circuit 920.

The determining circuit searches for the at least one second terminal that is associated with the same server as the terminal in the local area network in which the first terminal is located, and determines that the at least one second terminal and the terminal are in the same local area network.

Figure 10:
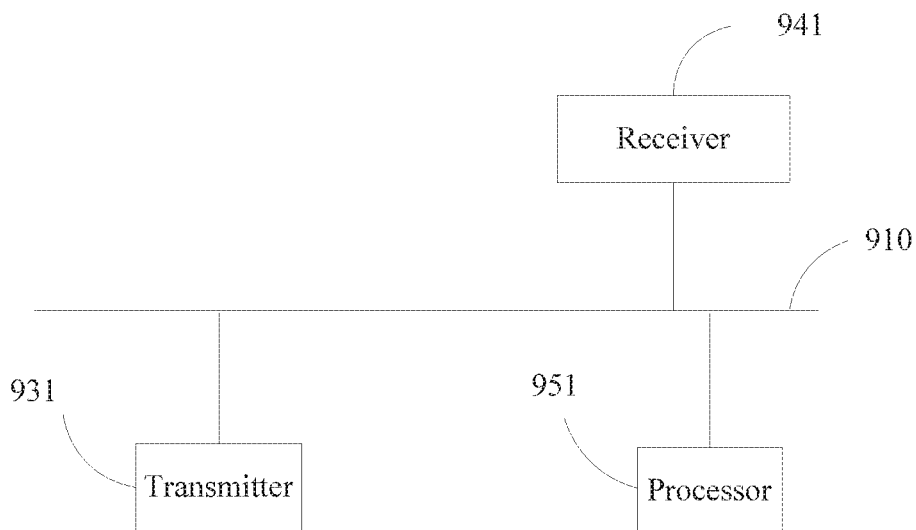
FIG. 10 is a schematic structural diagram of a terminal according to an embodiment of the present disclosure.

Optionally, as shown in FIG. 10, the determining circuit 920 includes a transmitter 931, a receiver 941, and a processor 951; and that the determining circuit determines that the at least one second terminal and the first terminal are in the same local area network is the transmitter is further configured to send a probe request to one or more other terminals in the local area network in which the first terminal is located, where the probe request includes login information for the first terminal to log in to the server; the receiver is configured to receive a response message from the at least one second terminal, where the response message is a response of the at least one second terminal to the probe request sent by the first terminal; and the processor is configured to determine, according to the response message, that the at least one second terminal and the first terminal are in the same local area network.

The transmitter is further configured to, after the determining circuit determines that the at least one second terminal and the first terminal are in the same local area network, send the data to the at least one second terminal by using the local area network.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the transmitter is further configured to send an indication message to the server, where the indication message is used to indicate that the first terminal sends, in the local area network, the data to the at least one second terminal. After receiving the indication message, the server no longer sends, to the at least one second terminal, the data uploaded by the first terminal.

In a possible implementation manner of this embodiment of the present disclosure, the first terminal and the at least one second terminal use a same account to log in to the server; the determining circuit includes a transmitter, a receiver, and a processor; and that the determining circuit determines that the at least one second terminal and the first terminal are in the same local area network is the transmitter is further configured to send a probe request to one or more other terminals in the local area network in which the first terminal is located, where the probe request includes login information for the first terminal to log in to the server; the receiver is configured to receive a response message from the at least one second terminal, where the response message is a response of the at least one second terminal to the probe request sent by the first terminal; and the processor is configured to determine, according to the response message, that the at least one second terminal and the first terminal are in the same local area network.

The login information may include account information and address information of the at least one second terminal. The probe request includes at least one of: the account information for the first terminal to log in to the server and the address information of the first terminal; and that the transmitter sends a probe request to one or more other terminals in the local area network is the transmitter broadcasts a message in the local area network to probe one or more other terminals that use a same account in the local area network to log in to a same cloud server; or the transmitter broadcasts a message to specific terminals in the local area network to probe one or more other terminals that use a same account in the local area network to log in to a same cloud server; or when a user of the terminal learns that one or more other terminals use a same account for login in the local area network, the transmitter sends a message by means of directional unicast to a terminal corresponding to an instruction ID in the local area network.

After receiving the probe request sent by the first terminal, the at least one second terminal acquires the account information for the first terminal to log in to the server. The at least one second terminal sends a response to the probe request to the first terminal, where the response includes at least one of: the account information for the at least one second terminal to log in to the server and the address information of the at least one second terminal. The receiver receives the response of the at least one second terminal to the probe request, and the processor determines, according to the response message, that the at least one second terminal and the first terminal are in the same local area network.

Embodiment 10

Figure 11:
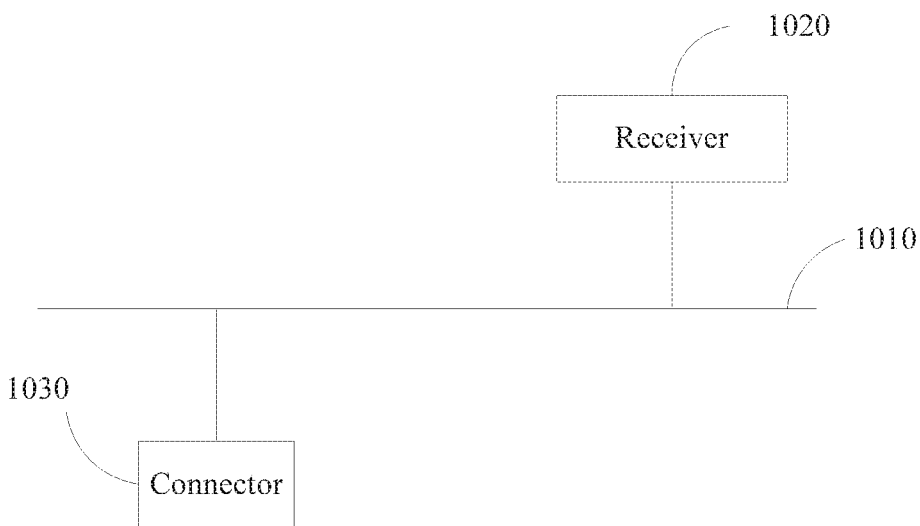
FIG. 11 is a schematic structural diagram of a terminal according to an embodiment of the present disclosure.

FIG. 11 is a schematic structural diagram of an embodiment of a terminal according to the present disclosure. For ease of description, the terminal is called a first terminal in this embodiment of the present disclosure. As shown in the figure, the first terminal includes the following components.

A connector 1030 is associated with a server, where the server is associated with the second terminal, and the first terminal and the second terminal are in a same local area network.

The server is associated with the at least one second terminal, where the association may be that the server is connected to the at least one second terminal. The first terminal and the at least one second terminal log in to the same server. An account that the at least one second terminal uses to log in to the server may be the same as or different from an account that the first terminal uses to log in to the server.

The first terminal and the second terminal are in the same local area network. Optionally, the first terminal receives a notification from the server, where the notification includes information of the at least one second terminal that is in the same local area network as the first terminal, such as login information and/or address information of the at least one second terminal. Optionally, the first terminal sends a probe request to one or more other terminals in the local area network in which the first terminal is located, to probe the at least one second terminal that logs in to the same server as the first terminal, and determines, according to responses of the one or more other terminals to the probe request, the at least one second terminal that is in the same local area network as the first terminal.

A receiver 1020 receives data that is sent by the second terminal by using the local area network, where the data is to-be-synchronized data that is uploaded by the second terminal to the server.

The first terminal and the second terminal are in the same local area network. The second terminal sends the data to the first terminal by using the local area network, and the receiver receives the data that is sent by the second terminal by using the local area network.

A communication bus 1010 is configured to implement connection and communication between the connector 1030 and the receiver 1020.

In this embodiment of the present disclosure, the first terminal implements data synchronization with the at least one second terminal in the same local area network. In this way, time consumption of synchronization is reduced, and synchronization efficiency is improved.

In a possible implementation manner of this embodiment of the present disclosure, the first terminal and the at least one second terminal use a same account to log in to the server; the receiver is further configured to receive, before receiving the data that is sent by the second terminal by using the local area network, a probe request that is sent by the second terminal by using the local area network, where the probe request includes login information for the first terminal to log in to the server.

The first terminal further includes a transmitter configured to send a response message to the second terminal after the receiver receives the probe request, where the response message is used to indicate that the first terminal and the second terminal are in the same local area network, and the response message is a response of the at least one second terminal to the probe request sent by the first terminal.

In a possible implementation manner of this embodiment of the present disclosure, the receiver is further configured to receive, before receiving the data that is sent by the second terminal by using the local area network, a request for performing data synchronization in the local area network sent by the second terminal.

The first terminal further includes a transmitter configured to send a response to the data synchronization request to the second terminal after the receiver receives the request for performing data synchronization in the local area network. The response may be used to indicate that the first terminal agrees to the request for performing data synchronization in the local area network sent by the second terminal.

In a possible implementation manner of this embodiment of the present disclosure, the data synchronization request includes a synchronization credential, where the synchronization credential includes at least identity information of the data; and the terminal further includes a processor configured to, after the receiver receives the data that is sent by the second terminal by using the local area network, when it is determined that the synchronization credential matches the data, determine that the data is the to-be-synchronized data sent by the second terminal. The synchronization credential may be one or more of identities such as a digest, a hash value, a name, and a size of the data. The processor matches the synchronization credential with the data received by the terminal, and when the synchronization credential matches the data, determines that the data is the to-be-synchronized data sent by the second terminal.

In a possible implementation manner of this embodiment of the present disclosure, the processor is further configured to extract the identity information of the data after the receiver receives the data that is sent by the second terminal by using the local area network. The identity information may include one or more of identities such as a digest, a hash value, a name, and a size of the data. The transmitter is further configured to send a verification request to the server, where the verification request is used to request the server to verify whether the identity information matches the synchronized data that is sent by the second terminal and received by the server, and the verification request includes the identity information. The receiver is further configured to receive confirmation information that is sent by the server according to the verification request when the identity information matches the to-be-synchronized data that is sent by the second terminal and received by the server, where the confirmation information is used to confirm that the data received by the terminal is consistent with the synchronized data that is sent by the second terminal to the server.

Further, the receiver is further configured to receive an indication message that is sent by the server according to the verification request when the identity information does not match the synchronized data that is sent by the second terminal and received by the server, where the indication message is used to indicate that the data received by the first terminal does not match the to-be-synchronized data sent by the second terminal.

The receiver may be further configured to receive the data that is sent by the second terminal and received by the server and sent by the server. The processor is further configured to delete the data that is sent by the second terminal and received by the first terminal.

Embodiment 11

Figure 12:
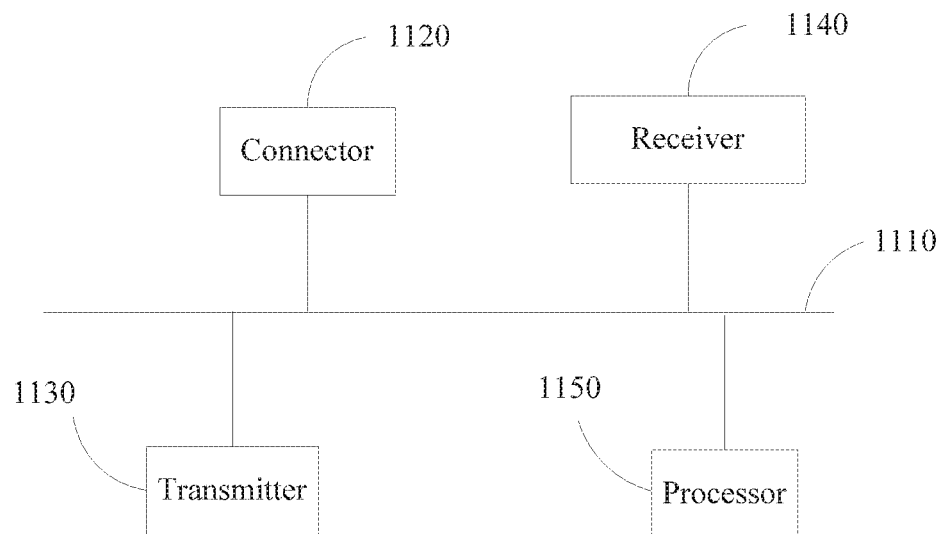
FIG. 12 is a schematic structural diagram of a server according to an embodiment of the present disclosure.

FIG. 12 is a schematic structural diagram of an embodiment of a server according to the present disclosure. As shown in the figure, the server includes the following components.

A connector 1120 is configured to associate with a first terminal and associate with at least one second terminal.

The connector is associated with the first terminal, where the association may be that the first terminal is connected to the server. The server is associated with the at least one second terminal, where the association may be that the at least one second terminal is connected to the server.

A receiver 1140 is configured to receive data uploaded by the first terminal; the first terminal has to-be-synchronized data; and the first terminal sends the to-be-synchronized data to the server, and the receiver receives the data uploaded by the first terminal.

A processor 1150 is configured to acquire information of the at least one second terminal, where the server is associated with the at least one second terminal. The association may be that the second terminal is connected to the server. The processor acquires the information of the at least one second terminal. The information of the at least one second terminal may include one or more of: address information, login information and the like of the at least one second terminal.

A transmitter 1130 is configured to send a notification to the first terminal, where the notification includes the information of the at least one second terminal.

A communication bus 1110 is configured to implement connection and communication between the connector 1120, the transmitter 1130, the receiver 1140, and the processor 1150.

In this embodiment of the present disclosure, the first terminal determines, according to the notification sent by the server, the at least one second terminal that is in a same local area network as the terminal, and implements data synchronization in the same local area network. In this way, time consumption of synchronization is reduced, and synchronization efficiency is improved.

In a possible implementation manner of this embodiment of the present disclosure, the receiver is further configured to receive an indication message sent by the first terminal, where the indication message is used to indicate that the first terminal sends, in the local area network, the data to the at least one second terminal. After acquiring the indication message, the processor sends an instruction to the transmitter, so that the data that is sent by the first terminal and received by the server is no longer sent to the at least one second terminal.

In a possible implementation manner of this embodiment of the present disclosure, the receiver is further configured to receive a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; the processor is further configured to confirm whether the data that is uploaded by the first terminal and received by the server is consistent with the identity information; and the transmitter is further configured to, when the processor confirms that the data that is uploaded by the first terminal and received by the server is consistent with the identity information, send confirmation information to the at least one second terminal, where the confirmation information is used to confirm that the data received by the at least one second terminal matches the data received by the server. The identity information may be one or more of identities such as a digest, a hash value, a name, and a size of the data.

Further, the transmitter is further configured to, when the processor confirms that the data that is uploaded by the first terminal and received by the server is inconsistent with the identity information, send an indication message to the at least one second terminal, where the indication message is used to confirm that the data received by the at least one second terminal does not match the data received by the server.

Embodiment 12

Figure 13:
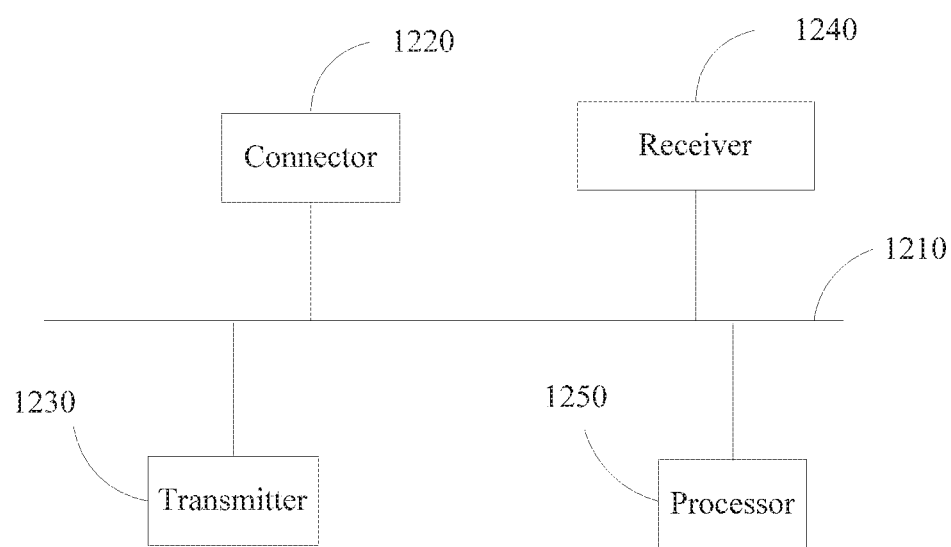
FIG. 13 is a schematic structural diagram of a server according to an embodiment of the present disclosure.

FIG. 13 is a schematic structural diagram of an embodiment of a server according to the present disclosure. As shown in the figure, the server includes the following components.

A connector 1220 is configured to associate with a first terminal and associate with at least one second terminal.

A receiver 1240 is configured to receive data uploaded by the first terminal.

A processor 1250 is configured to acquire information of the at least one second terminal, and determine whether the first terminal and the at least one second terminal are in a same local area network. The processor acquires the information of the at least one second terminal. The information of the at least one second terminal may include one or more of: address information, login information and the like of the at least one second terminal. The processor acquires information of the first terminal. The information of the first terminal may include one or more of: address information, login information and the like of the at least one second terminal. The processor determines, according to the information of the first terminal and the information of the at least one second terminal, that the first terminal and the at least one second terminal are in the same local area network.

A transmitter 1230 is configured to, when the processor determines that the first terminal and the at least one second terminal are in the same local area network, send a notification to the first terminal, where the notification includes the information of the at least one second terminal, and the at least one second terminal and the first terminal are in the same local area network.

A communication bus 1210 is configured to implement connection and communication between the connector 1220, the transmitter 1230, the receiver 1240, and the processor 1250.

In this embodiment of the present disclosure, the first terminal determines, according to the notification sent by the server, the at least one second terminal that is in the same local area network as the terminal, and implements data synchronization in the same local area network. In this way, time consumption of synchronization is reduced, and synchronization efficiency is improved.

In a possible implementation manner of this embodiment of the present disclosure, the receiver is further configured to receive an indication message sent by the first terminal, where the indication message is used to indicate that the first terminal sends, in the local area network, the data to the at least one second terminal. After acquiring the indication message, the processor sends an instruction to the transmitter, so that the data that is sent by the first terminal and received by the server is no longer sent to the at least one second terminal.

In a possible implementation manner of this embodiment of the present disclosure, the receiver is further configured to receive a verification request sent by the at least one second terminal, where the verification request includes identity information of the data that is sent by the first terminal in the local area network and received by the at least one second terminal, and the verification request is used to request the server to verify whether the identity information matches the data that is uploaded by the first terminal and received by the server; the processor is further configured to confirm whether the data that is uploaded by the first terminal and received by the server is consistent with the identity information; and the transmitter is further configured to, when the processor confirms that the data that is uploaded by the first terminal and received by the server is consistent with the identity information, send confirmation information to the at least one second terminal, where the confirmation information is used to confirm that the data received by the at least one second terminal matches the data received by the server. The identity information may be one or more of identities such as a digest, a hash value, a name, and a size of the data.

Further, the transmitter is further configured to, when the processor confirms that the data that is uploaded by the first terminal and received by the server is inconsistent with the identity information, send an indication message to the at least one second terminal, where the indication message is used to confirm that the data received by the at least one second terminal does not match the data received by the server.

The technical solutions described in the foregoing embodiments of the present disclosure are not only applicable to cloud synchronization, but also applicable to synchronization between servers on the Internet. The cloud synchronization includes data synchronization between a cloud device and a server, and further includes individual-centered data sharing between different devices.

It should be noted that mutual reference may be made to corresponding technical features in the foregoing embodiments.

A person of ordinary skill in the art may understand that all or some of the processes of the methods in the foregoing embodiments may be implemented by a computer program instructing relevant hardware. The program may be stored in a computer-readable storage medium. When the program runs, the processes of the methods in the foregoing embodiments are performed. The storage medium may include a magnetic disk, an optical disc, a read-only memory (ROM), or a random access memory (RAM).

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A synchronization method, comprising:
   uploading, by a first terminal, to-be-synchronized data to a server, wherein the server and the first terminal are associated with a local area network (LAN);
   receiving, by the first terminal from the server, a notification comprising first information of at least one second terminal;
   while the first terminal is uploading the to-be-synchronized data to the server, sending, by the first terminal, a probe request to one or more other terminals in the LAN, wherein the probe request comprises second information of the first terminal;
   receiving, by the first terminal, a response from the one or more other terminals in the LAN responsive to sending the probe request, wherein the response is used to permit the first terminal to identify the one or more other terminals in the LAN to receive the to-be-synchronized data, wherein the at least one second terminal is included in the one or more other terminals;
   identifying, by the first terminal according to the notification received, that the first terminal and the at least one second terminal are in the LAN;
   sending, by the first terminal, the to-be-synchronized data to the at least one second terminal using the LAN in response to identifying that the first terminal and the at least one second terminal are in the LAN; and
   sending, by the first terminal, an indication message to the server, wherein the indication message indicates that the first terminal has sent the to-be-synchronized data to the at least one second terminal and instructs the server to discontinue sending the to-be-synchronized data to the at least one second terminal.

2. The synchronization method of claim 1, wherein the first information of the at least one second terminal comprises information for the at least one second terminal to log in to the server, wherein the first terminal and the at least one second terminal use a same account to log in to the server, and wherein determining, by the first terminal according to the notification, that the first terminal and the at least one second terminal are in the LAN comprises:
   receiving, by the first terminal, a response message from the at least one second terminal; and
   determining, according to the response message, that the at least one second terminal and the first terminal are in the LAN, wherein the response message is a response of the at least one second terminal to the probe request sent by the first terminal.

3. A synchronization method, comprising:
   associating a server with a first terminal, wherein the server and the first terminal are in a local area network (LAN);
   receiving to-be-synchronized data uploaded from the first terminal;
   acquiring information of at least one second terminal;
   sending, by the server, a notification to the first terminal comprising first information of the at least one second terminal when the first terminal and the at least one second terminal are in the LAN, wherein the notification is used to permit the first terminal to identify the at least one second terminal to receive the to-be-synchronized data uploaded from the first terminal; and
   receiving, by the server, an indication message from the first terminal, wherein the indication message is used to indicate that the first terminal has sent the to-be-synchronized data to the at least one second terminal and to instruct the server to discontinue sending the to-be-synchronized data to the at least one second terminal.

4. The synchronization method of claim 3, further comprising:
   receiving, by the server, a verification request sent by the at least one second terminal, wherein the verification request comprises identity information of the to-be-synchronized data from the first terminal in the LAN and received by the at least one second terminal, wherein the verification request is used to request the server to verify whether the identity information matches the to-be-synchronized data uploaded by the first terminal and received by the server; and
   sending, by the server, confirmation information to the at least one second terminal when the to-be-synchronized data uploaded by the first terminal and received by the server is consistent with the identity information, wherein the confirmation information is used to confirm that the to-be-synchronized data received by the at least one second terminal matches the to-be-synchronized data received by the server.

5. The synchronization method of claim 4, further comprising sending, by the server, an indication message to the at least one second terminal, wherein the to-be-synchronized data uploaded by the first terminal and received by the server is inconsistent with the identity information, wherein the indication message is used to confirm that the to-be-synchronized data received by the at least one second terminal does not match the to-be-synchronized data received by the server.

6. A first terminal, comprising:
a transmitter configured to:
upload to-be-synchronized data to a server, wherein the first terminal and the server are associated with a local area network (LAN);
send, while the transmitter is uploading the to-be-synchronized data to the server, a probe request to at least one second terminal in the LAN, wherein the probe request comprises first information of the first terminal;
send the to-be-synchronized data to the at least one second terminal by using the LAN when the first terminal and the at least one second terminal are in the LAN; and
send an indication message to the server, wherein the indication message indicates that the first terminal has sent the to-be-synchronized data to the at least one second terminal and instructs the server to discontinue sending the to-be-synchronized data to the at least one second terminal;
a receiver coupled to the transmitter and configured to:
receive a notification comprising second information of the at least one second terminal; and
receive a response from the at least one second terminal in the LAN responsive to sending a probe request to the at least one second terminal, wherein the response is used to permit the first terminal to identify the at least one second terminal to receive the to-be-synchronized data; and
a processor coupled to the transmitter and the receiver, wherein the processor is configured to identify, according to the notification received, that the first terminal and the at least one second terminal are in the LAN.

7. The first terminal of claim 6, wherein the second information of the at least one second terminal comprises login information for the at least one second terminal to log in to the server, wherein the first terminal and the at least one second terminal use a same account to log in to the server, wherein the transmitter is further configured to send a probe request to one or more other terminals in the LAN in which the first terminal is located, wherein the probe request comprises the first information of the first terminal to log in to the server, wherein the receiver is further configured to receive a response message from the at least one second terminal, wherein the response message is a response of the at least one second terminal to the probe request sent by the first terminal, and wherein the processor is further configured to determine, according to the response message, that the at least one second terminal and the first terminal are in the LAN.

8. The first terminal of claim 6, wherein the transmitter is further configured to send an indication message to the server, wherein the indication message is used to indicate that the first terminal sends, in the local area network, the to-be-synchronized data to the at least one second terminal.

* * * * *